US011500970B2

(12) United States Patent
Bos et al.

(10) Patent No.: US 11,500,970 B2
(45) Date of Patent: Nov. 15, 2022

(54) MACHINE LEARNING MODEL AND METHOD FOR DETERMINING IF THE MACHINE LEARNING MODEL HAS BEEN COPIED

(71) Applicant: NXP B.V., Eindhoven (NL)

(72) Inventors: Joppe Willem Bos, Wijgmaal (BE); Simon Johann Friedberger, Heverlee (BE); Nikita Veshchikov, Brussels (BE); Christine van Vredendaal, Eindhoven (NL)

(73) Assignee: NXP B.V., Eindhoven (NL)

( * ) Notice: Subject to any disclaimer, the term of this patent is extended or adjusted under 35 U.S.C. 154(b) by 720 days.

(21) Appl. No.: 16/529,882

(22) Filed: Aug. 2, 2019

(65) Prior Publication Data

US 2021/0034721 A1 Feb. 4, 2021

(51) Int. Cl.
*G06F 21/16* (2013.01)
*G06F 21/10* (2013.01)
(Continued)

(52) U.S. Cl.
CPC ............ *G06F 21/16* (2013.01); *G06F 21/105* (2013.01); *G06K 9/6256* (2013.01); *G06K 9/6267* (2013.01); *G06N 20/00* (2019.01)

(58) Field of Classification Search
CPC ...................................................... G06F 21/16
See application file for complete search history.

(56) References Cited

U.S. PATENT DOCUMENTS 11,023,814 B1* 6/2021 Lee ........................ G06F 16/215
11,301,718 B2* 4/2022 Hamedi ............... G06K 9/6256
(Continued)

FOREIGN PATENT DOCUMENTS

CN 104680473 A 6/2015
CN 106651805 A 5/2017
(Continued)

OTHER PUBLICATIONS

Adi, Yossi et al.; "Turning Your Weakness Into a Strength: Watermarking Deep Neural Networks by Backdooring;" 27th USENIX Security Symposium, Aug. 15-17, 2018, Baltimore, Maryland; pp. 1615-1631; https://www.usenix.org/conference/usenixsecurity18/presentation/adi.

(Continued)

*Primary Examiner* — Simon P Kanaan
(74) *Attorney, Agent, or Firm* — Daniel D. Hill

(57) ABSTRACT

A method and data processing system are provided for determining if a machine learning model has been copied. The machine learning model has a plurality of nodes, the plurality of nodes is organized as a plurality of interconnected layers, and the plurality of interconnected layers includes an input layer and an output layer. The output layer has a predetermined number of output nodes for classifying input samples into a predetermined number of categories, where each output node corresponds to a category. An additional watermarking node is added to the output layer. The model is trained to classify the input data into the predetermined number of categories and into an additional category for the additional node. The additional node may be added to another model to determine if the another model is a copy or clone of the ML model.

20 Claims, 8 Drawing Sheets

(51) Int. Cl.
  *G06N 20/00* (2019.01)
  *G06K 9/62* (2022.01)

(56) References Cited

U.S. PATENT DOCUMENTS

2019/0171978 A1* 6/2019 Bonawitz ............... G06F 16/95
2021/0089861 A1* 3/2021 Sibille .................... G06N 3/04

FOREIGN PATENT DOCUMENTS

CN         107194863 A    9/2017
WO    WO-2010100398 A1   9/2010

OTHER PUBLICATIONS

Khan, Asifullah et al.; "Machine Learning Based Adaptive Watermark Decoding in View of Anticipated Attack;" Pattern Recognition 41(8):2594-2610 Aug. 2008; DOI: 10.1016/j.patcog.2008.01.007.
Kirbiz, Serap et al. "Robust Audio Watermark Decoding by Supervised Learning;" 2006 IEEE International Conference on Acoustics Speech and Signal Processing Proceedings; May 14-19, 2006; Toulouse, France; DOI: 10.1109/ICASSP.2006.1661387.
Le Merrer, et al.; "Adversarial Frontier Stitching for Remote Neural Network Watermarking," CoRR, vol. abs/1711.01894, Nov. 6, 2017; http://arxiv.org/abs/1711.01894.
Peng, Hong et al.; "Image Watermarking Method in Multiwavelet Domain Based on Support Vector Machines". The Journal of Systems and Software 83 (Accepted Mar. 1, 2010) 1470-1477; doi>10.1016/j.jss.2010.03.006.
Uchida, Yusuke et al.; "Embedding Watermarks Into Deep Neural Networks;" ACM on International Conference on Multimedia Retrieval—ICMR, B. Ionescu, N. Sebe, J. Feng, M. Larson, R. Lienhart, and C. Snoek, Eds. ACM, Apr. 20, 2017, pp. 269-277; https://doi.org/10.1145/3078971.3078974.
Zhang, Jialong et al.; "Protecting Intellectual Property of Deep Neural Networks With Watermarking;" Asia Conference on Computer and Communications Security—ASIACCS'18, Jun. 4-8, 2018, Incheon, Republic of Korea; pp. 159-172.
U.S. Appl. No. 16/250,074; Inventor, Nikita Veshchikov et al.; "Method for Determining if a Machine Learning Model Has Been Copied," filed Jan. 17, 2019.

* cited by examiner

MACHINE LEARNING MODEL AND METHOD FOR DETERMINING IF THE MACHINE LEARNING MODEL HAS BEEN COPIED

BACKGROUND

Field

This disclosure relates generally to machine learning, and more particularly, to a machine learning model and method for determining if the machine learning model has been copied.

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of the ML model is influenced by its accuracy, execution time, storage requirements, and the quality of the training data. The expertise, time, and expense required for creating and training a machine learning model using this training data results in the ML model being a valuable asset.

Protecting a ML model from copying has become a problem. The model may be copied, or cloned, even when an attacker does not have direct access to the model. For example, when machine learning is provided as a service, a user only has access to the inputs and outputs of the model. To extract the ML model when the model is provided as a service, valid queries are provided to the model and the resulting output is compiled. Even when an attacker is just given access to the inputs and outputs, the machine learning model can be relatively easily copied. Also, extracting the model in this manner can result in a near identical copy of the machine learning model being produced. Once an attacker has copied the model, it can be illegitimately used and monetized.

Watermarks are commonly used to mark and prove ownership of a file. Embedding a watermark into a ML model may require the model to be trained with information about the watermark, which may alter the functionality of the model. The watermark also needs to be detectable while being difficult to remove or modify when the ML model is copied. Additionally, hiding the watermark from an attacker may be beneficial. The solutions to these problems can be difficult and costly to effectively implement.

Therefore, a need exists for a method to determine if a machine learning model is an illegitimate copy without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
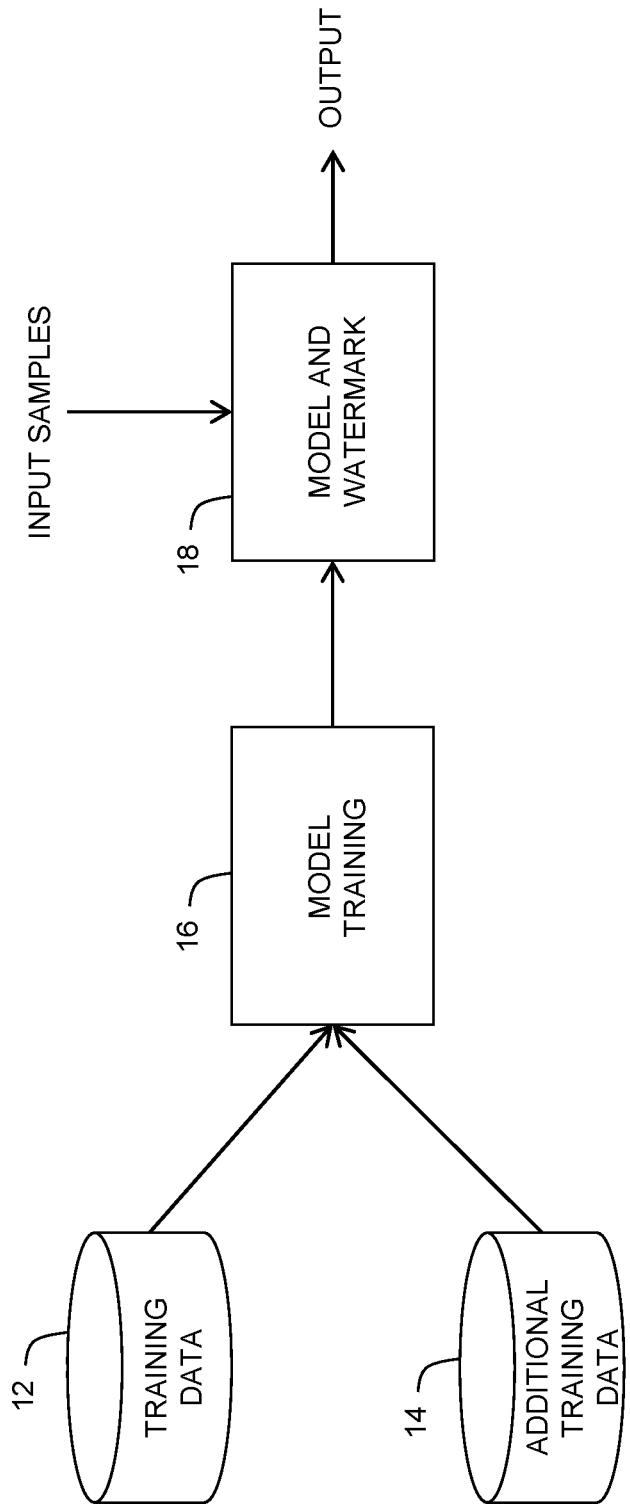
FIG. 1 illustrates training a ML model in accordance with an embodiment.

Generally, there is provided, a method for detecting copying of a ML model. In one embodiment, the ML model is based on a neural network (NN). The NN includes layers. Each layer includes one or more nodes. The nodes are interconnected by connections that are weighted by the training. An output layer includes a number of output nodes that corresponds to the number of output categories in which the NN is trained to classify. During training of a ML model, one or more additional output nodes are implemented into the NN. One or more extra categories, depending on the number of additional nodes are included during training of the model. The additional output node(s) are trained for the extra categories at the same time the model is trained for the normal output categories. After training, the additional output nodes and the weighted connections to the additional output nodes are removed. The part of the model that is necessary for the classification of the extra output categories is kept secret and can be used as a watermark of the model. The model is used as intended for the classifications in which it was trained except for the additional classification(s). In another embodiment, the ML model may be based on another algorithm such as a decision tree or a random forest. For example, a decision tree may be configured with additional branches to enable classification of an additional category or categories.

Another ML model that is suspected of being a copy or a clone can be tested using the watermark. The additional output nodes and connections are added to the suspected clone. If the model is a clone, the model will output the same additional categories as the original model in response to input samples of the additional categories, even though the attacker did not specifically train the clone for the additional categories. During inference operation, the ML model that is protected by the described method is indistinguishable from a model not protected by the described method. If an attacker does not know there is an additional node and watermarking category, then the attacker will not be motivated to attempt to guess the watermarking category or categories and attempt to remove the watermarking categories.

In accordance with an embodiment, there is provided, a method for determining if a machine learning model has been copied, the method including: providing a machine learning model having a plurality of nodes, the plurality of nodes organized as a plurality of interconnected layers, the plurality of interconnected layers including an input layer and an output layer; providing the output layer with a predetermined number of output nodes for classifying input samples into a predetermined number of categories, each output node corresponding to a category; adding an additional node to the output layer to classify the input data into the predetermined number of categories and into the additional category; training the machine learning model during a training phase using first training data to train the machine learning model for the predetermined number of categories and using second training data to train the machine learning model for the additional category; and removing the additional node from the machine learning model after the training is complete. Providing a machine learning model may further include providing a machine learning model having a neural network. The method may further include: adding the additional node to another machine learning model; operating the another machine learning model during an inference operation; and determining if the another machine learning model outputs the additional category from the additional node. Adding the additional node to the output layer may further include adding a plurality of additional nodes to the output layer. Adding the additional node to the output layer may further include adding a first additional node to the output layer and a second additional node to a hidden layer of the machine learning model. Adding the additional node to the output layer may further include adding a connection between the additional node and a node of a previous layer in the plurality of interconnected layers. Adding the additional node to the output layer may further include adding a connection between the additional node and a node in each previous layer of the plurality of interconnected layers. Removing the additional node from the machine learning model may further include removing the additional node and all connections between the additional node and other nodes of the plurality of nodes. The additional category may be unrelated to any one or more of the predetermined number of categories.

In another embodiment, there is provided, a method for determining if a machine learning model has been copied, the method including: providing a machine learning model having a plurality of nodes, the plurality of nodes organized as a plurality of interconnected layers, the plurality of interconnected layers including an input layer and an output layer; providing the output layer with a predetermined number of output nodes for classifying input samples into a predetermined number of categories, each output node corresponding to a category; adding an additional node to the output layer to classify the input data into the predetermined number of categories and into the additional category; training the machine learning model during a training phase using first training data to train the machine learning model for the predetermined number of categories and using second training data to train the machine learning model for the additional category; removing the additional node from the machine learning model after the training is complete; adding the additional node to an output layer of another machine learning model; operating the another machine learning model during an inference operation with the additional node; and determining if the another machine learning model outputs the additional category from the additional node. Adding the additional node to the output layer may further include adding a plurality of additional nodes to the output layer. Adding the additional node to the output layer may further include adding a first additional node to the output layer and a second additional node to a hidden layer of the machine learning model. Adding the additional node to the output layer may further include adding a connection between the additional node and a node of a previous layer in the plurality of interconnected layers. Adding the additional node to the output layer may further include adding a connection between the additional node and a node in each previous layer of the plurality of interconnected layers. Removing the additional node from the machine learning model may further include removing the additional node and all connections between the additional node and other nodes of the plurality of nodes.

In yet another embodiment, there is provided, a machine learning model including: a plurality of nodes organized as a plurality of layers, the plurality of layers including an input layer, a hidden layer, and an output layer; and a plurality of connections between the nodes, each connection comprising a weight, wherein a strength of each of the weights is determined during training of the machine learning model, and wherein the machine learning model is trained for more categories than there are output nodes in the output layer. The machine learning model may include a neural network. The machine learning model may include at least one fully connected layer. The categories in which the model is trained for may include an additional category, wherein the additional category may provide a watermark for the machine learning model. The additional category may be maintained as a secret.

A ML model may be trained using training data during a training operating phase. The ML model may be trained and used to make predictions such as weather forecasting or the pricing of goods. One relatively common usage is classification of input samples. For example, a ML model can be used to recognize people or traffic signs, or the ML model may be used to recognize spoken words. There are many types of ML algorithms. One algorithm that is commonly used is based on neural networks. A neural network (NN) tries to mimic the activity of a brain. The NN includes layers formed from nodes. Nodes in an input layer receive inputs to an ML system. The nodes are interconnected with each other by weighted connections that are adjusted by training. During inference operation, nodes of an output layer provide the resulting categories of predictions regarding the received input samples.

Figure 2:
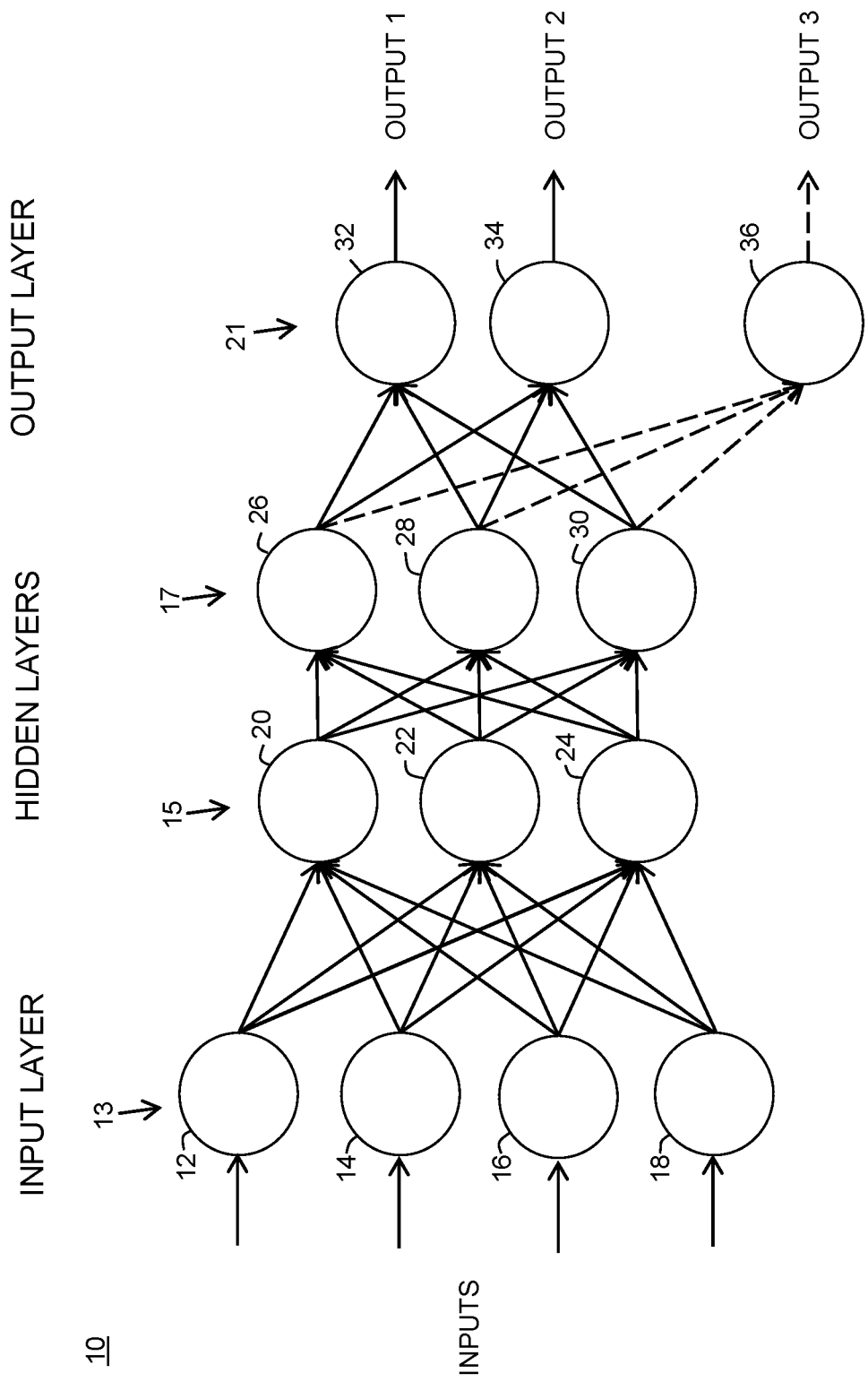
FIG. 2 illustrates a neural network configured with an additional output node for training in accordance with an embodiment.
Figure 4:
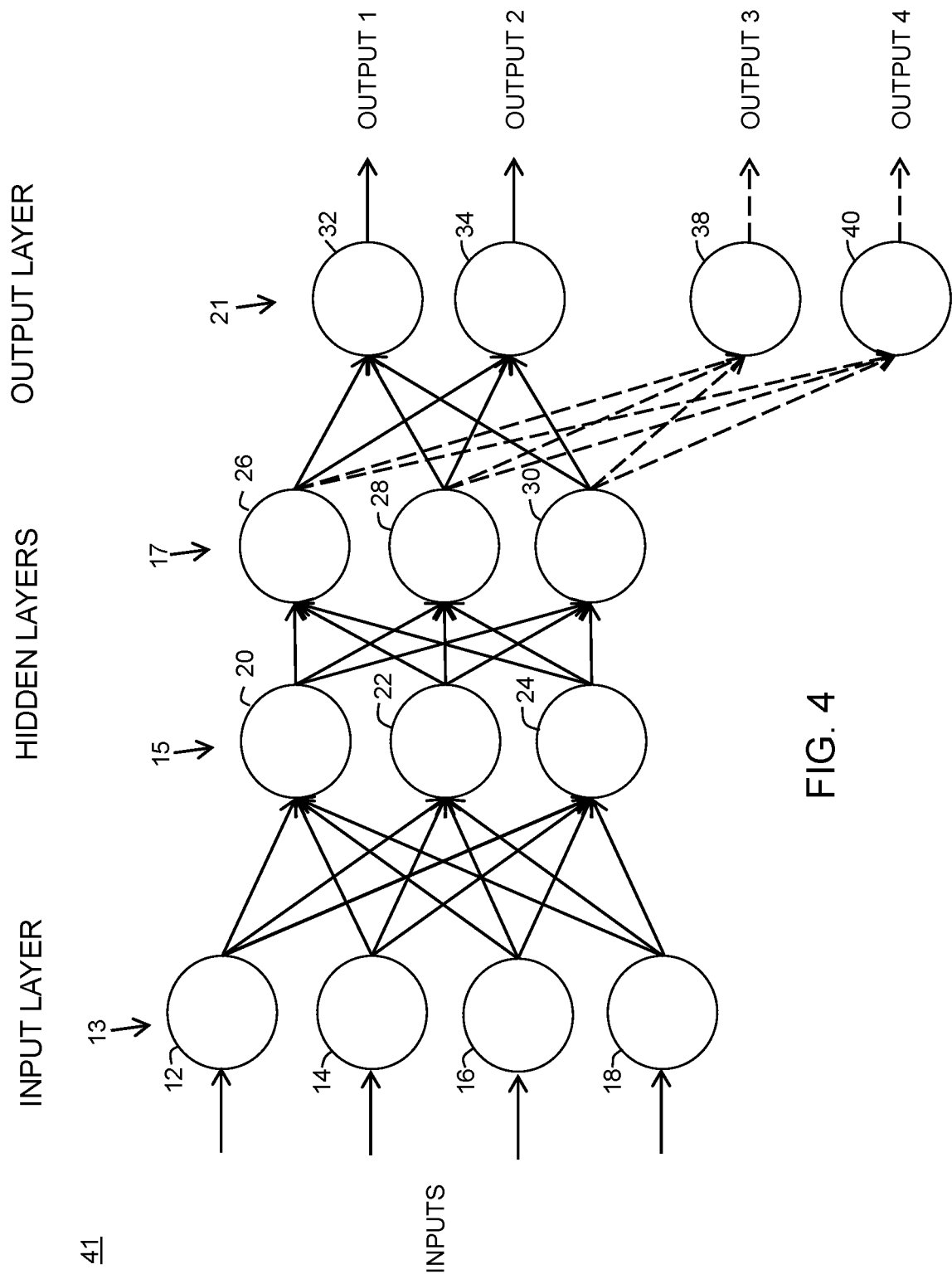
FIG. 4 illustrates a neural network configured for training in accordance with another embodiment.
Figure 5:
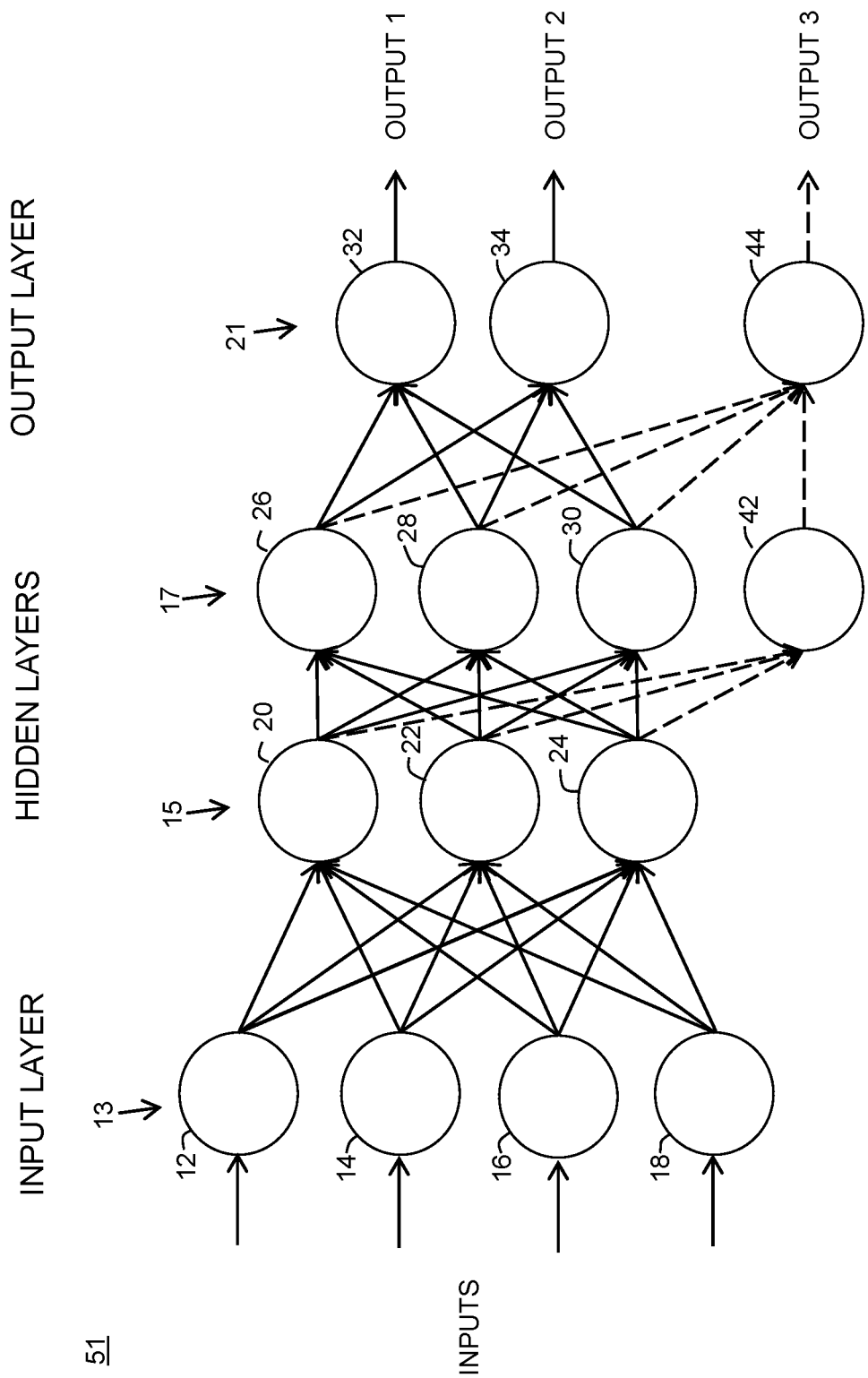
FIG. 5 illustrates a neural network configured for training in accordance with another embodiment.
Figure 6:
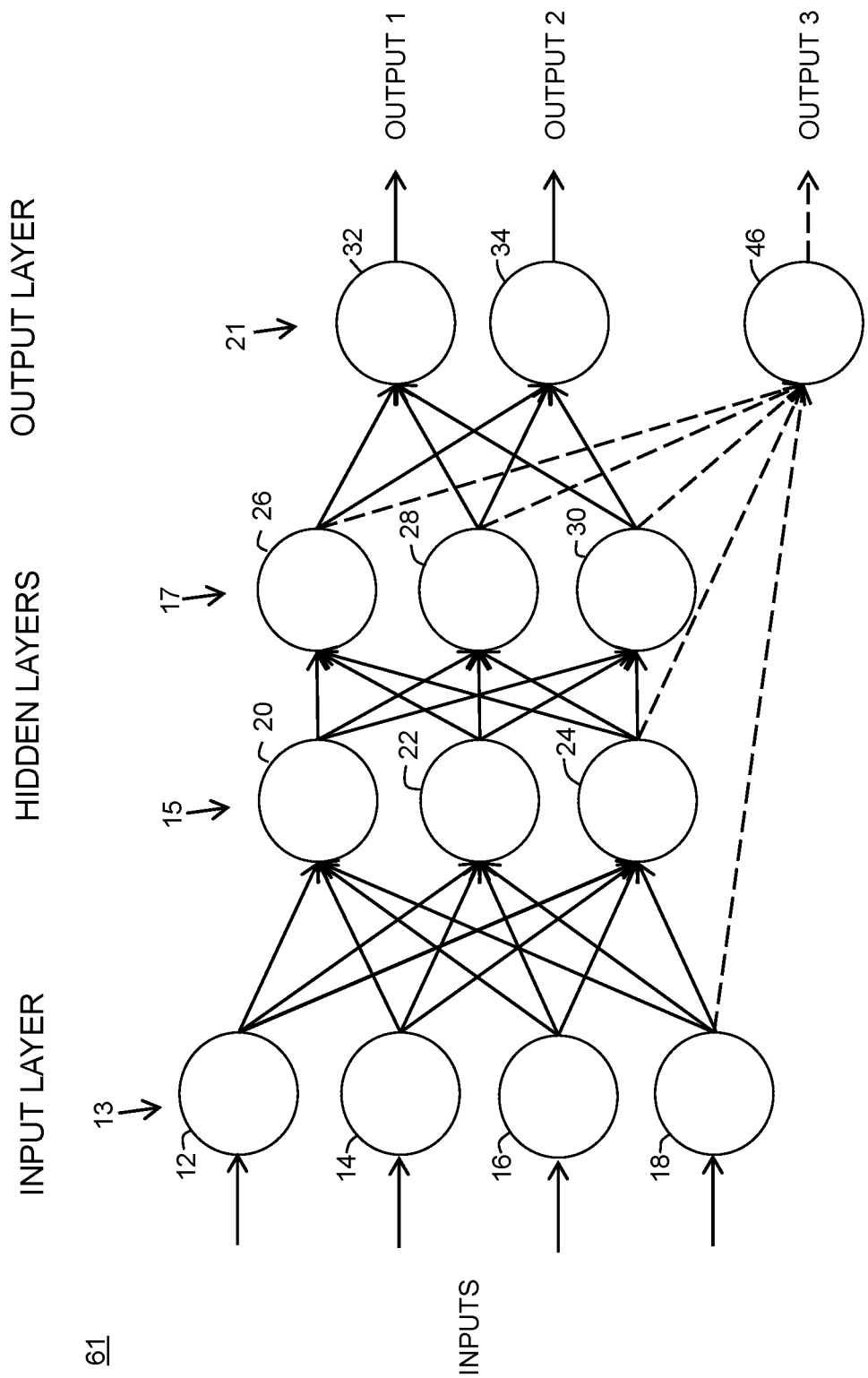
FIG. 6 illustrates a neural network configured for training in accordance with another embodiment.

FIG. 1 illustrates training and operation of a ML model and watermark in accordance with an embodiment. To train a NN, input data, such as input data 12, is manually labeled. The training data is input to the ML model during training operation 16. A well-trained ML model that makes accurate predictions can be a valuable asset that can be subject to industrial espionage, reverse engineering, and cloning attacks. Therefore, watermarks have been created to provide a way to mark a ML model and prove ownership. To embed a watermark in an ML model in accordance with an embodiment, an additional node is added to the output layer as illustrated in FIG. 2. FIGS. 4-6 show additional examples of watermarking node configurations. The model with the additional node(s) is trained with training data 12 and additional training data 14. Training data 12 is for training the model to provide predictions on input samples in a particular problem domain. The model is also trained with additional training data 14 for one or more additional categories for use as a watermark. Preferably, the additional categories are unrelated to the normal intended problem domain of the model. After training, the additional node and all of the weighted connections to the additional node are removed and kept as a secret. The model with watermark is ready for inference operation 18 in the problem domain the model was trained for with training data 12. During inference operation 18, input samples (INPUT SAMPLES) are input to the ML model, and the model provides output (OUTPUT) category predictions of input samples.

An extracted clone of the model will have the same or similar weighted connections as the original model. If another model is suspected of being an extracted clone, or copy, of the model trained in FIG. 1, the suspected clone can be configured with the additional node(s) and weighted connections from training the original model with additional training data 14. Then, when provided with input samples corresponding to one of the additional watermark categories, the suspected clone will provide substantially the same additional output categories as the original model. Thus, in this manner, the original ML model is watermarked to prove a suspected clone was likely extracted from the original model.

FIG. 2 illustrates neural network 10 configured for training in accordance with an embodiment. Generally, with neural networks, there are many possible configurations of nodes and connections between the nodes. Neural Network 10, as illustrated in FIG. 2, is only one simple embodiment for illustrating and describing an embodiment of the invention. Other embodiments can have a different configuration with a different number of layers and nodes. Other example configurations are illustrated in FIGS. 4-6. Neural network 10 includes input layer 13, hidden layers 15 and 17, and output layer 21. Input layer 13 includes nodes 12, 14, 16, and 18, hidden layer 15 includes nodes 20, 22, and 24, hidden layer 17 includes nodes 26, 28, and 30, and output layer 21 includes nodes 32 and 34. In addition, output layer 21 includes an additional node 36. Each of the nodes in output layer 21 corresponds to a prediction category. Additional node 36 represents an additional category. The additional category is used for watermarking the NN and may be any category. In other embodiments, there can be a different number of layers and each layer may have a different number of nodes. Preferably, the additional category is distinctly different than the normal output prediction categories. Once the ML model is trained, the additional category should be maintained as a secret. All the nodes in the layers are interconnected with each other. There are many variations for interconnecting the nodes. The layers illustrated in the example of FIG. 2 may be considered fully connected because a node in one layer is connected with all the nodes of the next layer. In the drawings, arrows indicate connections between the nodes. The connections are weighted by training and each node includes an activation function. In FIG. 2, additional node 36 is connected to nodes 26, 28, and 30 of hidden layer 17 by dashed lines. The additional connections are weighted by training just like the other connections in ML model 10.

During training, input samples (INPUTS) are provided to input layer 13. A strength of the weights of the various connections is adjusted during training based on the input samples from a training data set. The training data set will also include training data for classifying input samples into the additional secret category. After training, additional node 36 is removed. Also, all the connections, represented by dashed arrows in FIG. 2, are removed. The additional node 36, related connections, and the training data set for the additional output category are maintained as a secret. The resulting machine learning model is trained for the normal output categories and is ready for inference operation. However, with the additional nodes and connections removed, the ML model is also trained for the additional category, and has its weights trained for the additional watermarking category, however, without a way to output the additional category because the additional node(s) have removed. In other embodiments, the ML model can be trained with the additional watermarking training data after training with the normal training data. However, this may result in the additional watermarking category being less bound to the ML model so prediction accuracy may be worse than concurrent training.

Figure 3:
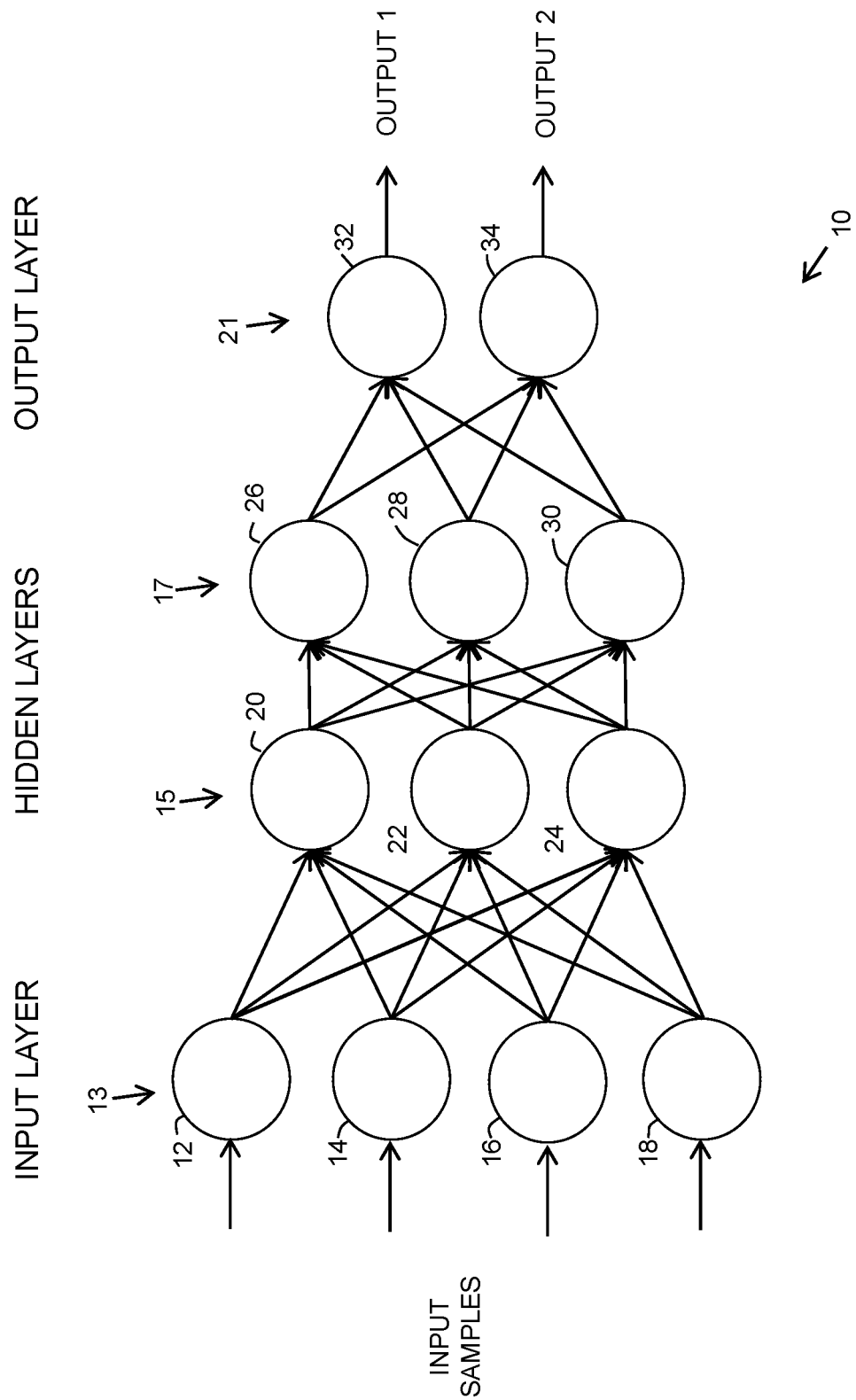
FIG. 3 illustrates the neural network of FIG. 2 after training in accordance with an embodiment.

FIG. 3 illustrates neural network 10 after training in accordance with an embodiment. Neural network 10 is shown in FIG. 3 after additional node 36 and the related connections are removed. During normal inference operation, input samples are provided to nodes 12, 14, 16, and 18 of input layer 13, and output predictions OUTPUT 1, OUTPUT 2 will be provided at output nodes 32 and 34.

In the event another ML model is suspected of being a copy or a clone, additional node 36 and the related connections are installed on the suspected copy so that the suspected copy looks like neural network 10 in FIG. 2 in which the training of the original model was performed. Then the suspected copy or clone is provided input samples corresponding to the additional output category. If the suspected copy consistently provides output predictions at output OUTPUT 3 (FIG. 2) that are the same as the secret additional category that the original ML model was trained to provide, then the suspected copy may be an actual copy or clone of the original model.

There are many possible ways to add additional node(s) to watermark a ML model. FIGS. 4 through 6 provide some additional examples.

FIG. 4 illustrates neural network 41 configured for training in accordance with another example. Neural network 41 includes two additional nodes 38 and 40, both additional nodes 38 and 40 being associated with output layer 21. Each of nodes 38 and 40 have connections to all of output nodes 26, 28, and 30. In other embodiments, other connections are possible. After training, additional nodes 38 and 40 are removed, along with all the connections to additional nodes 38 and 40 (indicated with the dashed lines). As mentioned above, the additional nodes, connections, and training data are maintained as a secret watermark.

FIG. 5 illustrates neural network 51 configured for training in accordance with another embodiment. Neural network 51 is the same as the above described networks except that two additional nodes 42 and 44 are each associated with a different layer. As an example, node 42 is associated with hidden layer 17 and node 44 is associated with output layer 21. Dashed lines show the connections to all the other nodes in the respective layer of each additional node. In other embodiments, other connections are possible. Additional nodes 42 and 44 and their dashed line connections are removed after training and kept as a secret for later possible use in establishing that another ML model is an extracted clone of the original model.

FIG. 6 illustrates a neural network during training in accordance with another embodiment. Neural network 61 is the same as the above described networks except that one additional node 46 is used for watermarking in accordance with another embodiment. In FIG. 6, additional node 46 has a dashed line connection to each of the other layers in ML model 61. After training with training data of an additional secret category, additional node 46 and the dashed line connections are removed and maintained secret for later use if another ML model is suspected to be a copy or clone of the original model.

Figure 7:
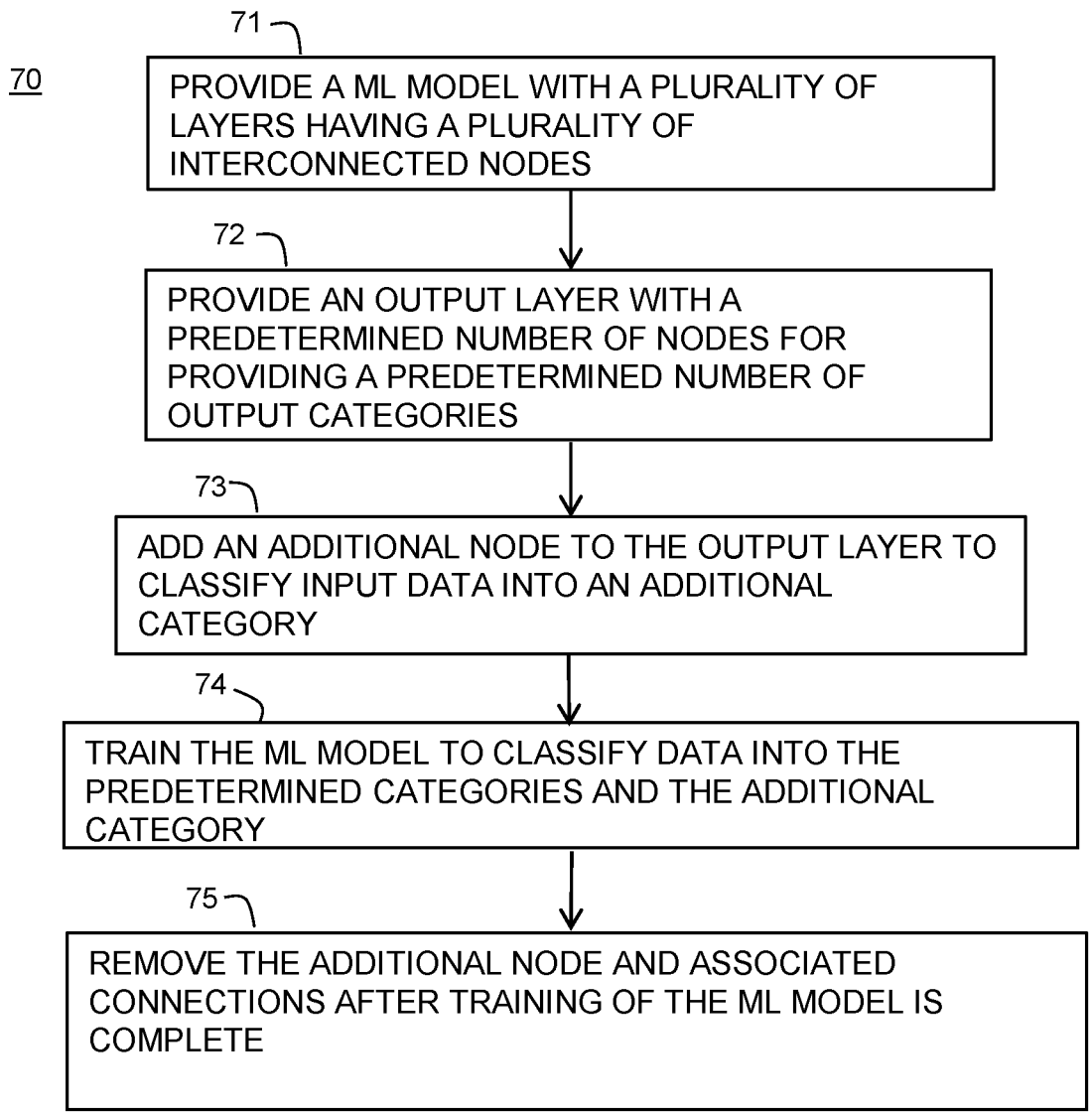
FIG. 7 illustrates a method for embedding a watermark into a ML model in accordance with an embodiment.

FIG. 7 illustrates method 70 for embedding a watermark into a ML model in accordance with an embodiment. Method 70 begins at step 71. At step 71, a ML model is provided with a plurality of layers, where each layer has a plurality of nodes. The nodes are connected to other nodes in the ML model with connections that are weighted by training. At step 72, the ML model has an output layer with a predetermined number of nodes for providing a predetermined number of output categories during inference operation. At step 73, an additional node is added to the ML model to classify input samples into an additional output category. At step 74, the ML model is trained using training data to classify input samples into normal operation categories and into the additional category or categories for purposes of providing a watermark for the ML model. The additional category, additional node, and connections are maintained as secret. At step 75, the additional node and associated connections are removed from the model. To detect a clone, the additional node and connections are installed on the suspected clone or copy. Input samples are provided to the suspected clone, if the additional node outputs the correct categories of the additional watermarking training data, the ML model being tested may be a clone.

Figure 8:
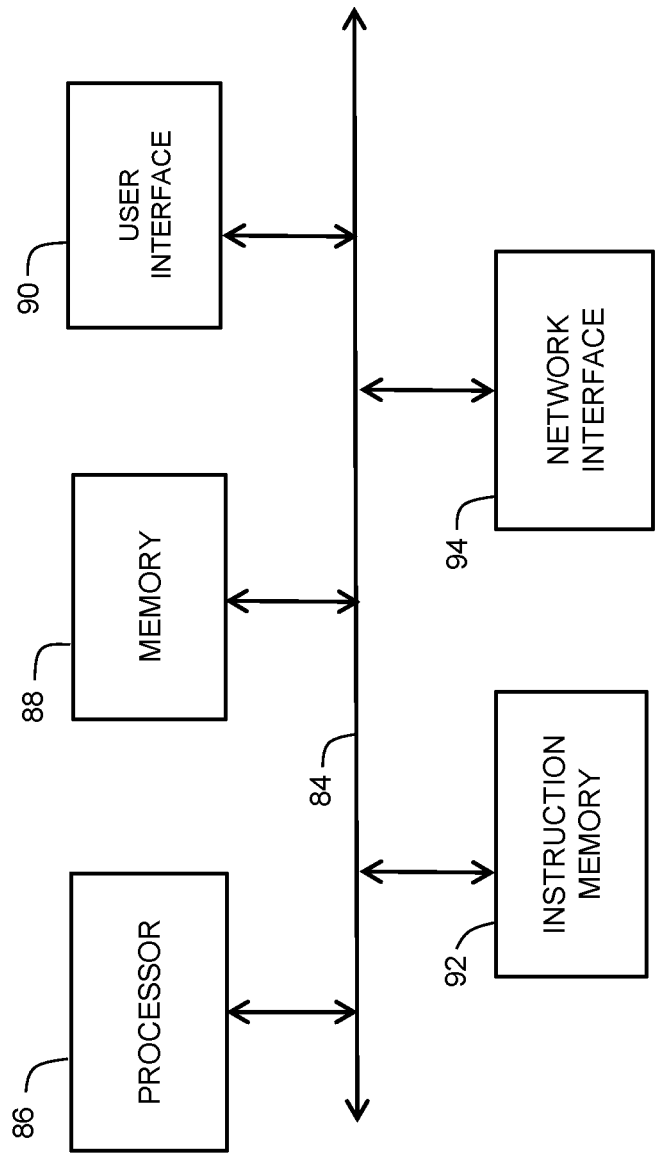
FIG. 8 illustrates a data processing system suitable for implementing a ML model.

FIG. 8 illustrates data processing system 80 suitable for implementing a ML model. Data processing system 80 may be implemented on one or more integrated circuits and may be used in an implementation of the machine learning system in accordance with the described embodiments. Data processing system 80 includes bus 84. Connected to bus 84 is processor 86, memory 88, user interface 90, instruction memory 92, and network interface 94. Processor 86 may be any hardware device capable of executing instructions stored in memory 88 or instruction memory 92. Processor 86 may execute instructions for implementing a ML model. Also, processor 86 may execute the machine learning algorithms using training data to train the ML model. Processor 86 may have multiple processing cores. Processor 86 may be, for example, a microprocessor, field programmable gate array (FPGA), application-specific integrated circuit (ASIC), or similar device. Processor 86 may be implemented in a secure hardware element and may be tamper resistant.

Memory 88 may be any kind of memory, such as for example, L1, L2, or L3 cache or system memory. Memory 88 may include volatile memory such as static random-access memory (SRAM) or dynamic RAM (DRAM), or may include non-volatile memory such as flash memory, read only memory (ROM), or other volatile or non-volatile memory. Also, memory 88 may be implemented in a secure hardware element. Alternately, memory 88 may be a hard drive implemented externally to data processing system 80.

User interface 90 may be connected to one or more devices for enabling communication with a user such as an administrator. For example, user interface 90 may be enabled for coupling to a display, a mouse, a keyboard, or other input/output device. Network interface 94 may include one or more devices for enabling communication with other hardware devices. For example, network interface 94 may include, or be coupled to, a network interface card (NIC) configured to communicate according to the Ethernet protocol. Also, network interface 94 may implement a TCP/IP stack for communication according to the TCP/IP protocols. Various other hardware or configurations for communicating are available.

Instruction memory 92 may include one or more machine-readable storage media for storing instructions for execution by processor 86. In other embodiments, both memories 88 and 92 may also store data upon which processor 86 may operate. Memories 88 and 92 may store a ML model as well as encryption, decryption, and verification applications. Memory 88 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for determining if a machine learning model has been copied, the method comprising:
   providing a machine learning model having a plurality of nodes, the plurality of nodes organized as a plurality of interconnected layers, the plurality of interconnected layers including an input layer and an output layer;
   providing the output layer with a predetermined number of output nodes for classifying input samples into a predetermined number of categories, each output node corresponding to a category;
   adding an additional node to the output layer to classify the input data into the predetermined number of categories and into the additional category;
   training the machine learning model during a training phase using first training data to train the machine learning model for the predetermined number of categories and using second training data to train the machine learning model for the additional category; and
   removing the additional node from the machine learning model after the training is complete.

2. The method of claim 1, wherein providing a machine learning model further comprises providing a machine learning model having a neural network.

3. The method of claim 1, further comprising:
adding the additional node to another machine learning model;
operating the another machine learning model during an inference operation; and
determining if the another machine learning model outputs the additional category from the additional node.

4. The method of claim 1, wherein adding the additional node to the output layer further comprises adding a plurality of additional nodes to the output layer.

5. The method of claim 1, wherein adding the additional node to the output layer further comprises adding a first additional node to the output layer and a second additional node to a hidden layer of the machine learning model.

6. The method of claim 1, wherein adding the additional node to the output layer further comprises adding a connection between the additional node and a node of a previous layer in the plurality of interconnected layers.

7. The method of claim 1, wherein adding the additional node to the output layer further comprises adding a connection between the additional node and a node in each previous layer of the plurality of interconnected layers.

8. The method of claim 1, wherein removing the additional node from the machine learning model further comprises removing the additional node and all connections between the additional node and other nodes of the plurality of nodes.

9. The method of claim 1, wherein the additional category is unrelated to any one or more of the predetermined number of categories.

10. A method for determining if a machine learning model has been copied, the method comprising:
providing a machine learning model having a plurality of nodes, the plurality of nodes organized as a plurality of interconnected layers, the plurality of interconnected layers including an input layer and an output layer;
providing the output layer with a predetermined number of output nodes for classifying input samples into a predetermined number of categories, each output node corresponding to a category;
adding an additional node to the output layer to classify the input data into the predetermined number of categories and into the additional category;
training the machine learning model during a training phase using first training data to train the machine learning model for the predetermined number of categories and using second training data to train the machine learning model for the additional category;
removing the additional node from the machine learning model after the training is complete;
adding the additional node to an output layer of another machine learning model;
operating the another machine learning model during an inference operation with the additional node; and
determining if the another machine learning model outputs the additional category from the additional node.

11. The method of claim 10, wherein adding the additional node to the output layer further comprises adding a plurality of additional nodes to the output layer.

12. The method of claim 10, wherein adding the additional node to the output layer further comprises adding a first additional node to the output layer and a second additional node to a hidden layer of the machine learning model.

13. The method of claim 10, wherein adding the additional node to the output layer further comprises adding a connection between the additional node and a node of a previous layer in the plurality of interconnected layers.

14. The method of claim 10, wherein adding the additional node to the output layer further comprises adding a connection between the additional node and a node in each previous layer of the plurality of interconnected layers.

15. The method of claim 10, wherein removing the additional node from the machine learning model further comprises removing the additional node and all connections between the additional node and other nodes of the plurality of nodes.

16. A machine learning model implemented as instructions on a non-transitory machine-readable medium, the machine learning model comprising:
a plurality of nodes organized as a plurality of layers, the plurality of layers including an input layer, a hidden layer, and an output layer; and
a plurality of connections between the nodes, each connection comprising a weight, wherein a strength of each of the weights is determined during training of the machine learning model, and wherein the machine learning model is trained for more categories than there are output nodes in the output layer.

17. The machine learning model of claim 16, wherein the machine learning model comprises a neural network.

18. The machine learning model of claim 16, wherein the machine learning model comprises at least one fully connected layer.

19. The machine learning model of claim 16, wherein the categories in which the model is trained for includes an additional category, wherein the additional category provides a watermark for the machine learning model.

20. The machine learning model of claim 19, wherein the additional category is maintained as a secret.

* * * * *